US012580284B2

(12) United States Patent
Ahn et al.

(10) Patent No.: US 12,580,284 B2
(45) Date of Patent: Mar. 17, 2026

(54) BATTERY MODULE INCLUDING REMOVABLE FUSE ASSEMBLY AND BATTERY PACK INCLUDING THE SAME

(71) Applicant: LG ENERGY SOLUTION, LTD., Seoul (KR)

(72) Inventors: Hyung-Jun Ahn, Daejeon (KR); Su-Chang Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 779 days.

(21) Appl. No.: 17/792,183

(22) PCT Filed: Jul. 21, 2021

(86) PCT No.: PCT/KR2021/009451
§ 371 (c)(1),
(2) Date: Jul. 12, 2022

(87) PCT Pub. No.: WO2022/039394
PCT Pub. Date: Feb. 24, 2022

(65) Prior Publication Data
US 2023/0102692 A1 Mar. 30, 2023

(30) Foreign Application Priority Data
Aug. 21, 2020 (KR) ........................ 10-2020-0105314

(51) Int. Cl.
*H01M 50/583* (2021.01)
*H01H 85/143* (2006.01)
(Continued)

(52) U.S. Cl.
CPC ........ *H01M 50/583* (2021.01); *H01H 85/143* (2013.01); *H01H 85/165* (2013.01);
(Continued)

(58) Field of Classification Search
CPC ............. H01M 50/583; H01M 50/505; H01M 50/503; H01M 50/271
See application file for complete search history.

(56) References Cited

U.S. PATENT DOCUMENTS

2001/0046624 A1* 11/2001 Goto ................... H01M 50/298
180/68.5
2004/0007375 A1 1/2004 Higuchi et al.
(Continued)

FOREIGN PATENT DOCUMENTS

DE 1 488 404 A1 4/1969
EP 1 075 012 A2 2/2001
(Continued)

OTHER PUBLICATIONS

International Search Report (PCT/ISA/210) issued in PCT/KR2021/009451, dated Oct. 28, 2021.
(Continued)

*Primary Examiner* — Kenneth J Douyette
(74) *Attorney, Agent, or Firm* — Birch, Stewart, Kolasch & Birch, LLP

(57) ABSTRACT
A battery module includes: a plurality of battery cells; a module case configured to accommodate the plurality of battery cells; an electrode terminal provided outside the module case; and a fuse assembly provided to be attachable to or detachable from an outer side of the module case, and
(Continued)

including a busbar having one end connected to the electrode terminal and the other end connected to an external cable and configured to break when an overcurrent occurs, and a fuse case configured to accommodate the busbar.

15 Claims, 10 Drawing Sheets

(51) Int. Cl.

| | |
|---|---|
| *H01H 85/165* | (2006.01) |
| *H01M 50/271* | (2021.01) |
| *H01M 50/503* | (2021.01) |
| *H01M 50/505* | (2021.01) |

(52) U.S. Cl.
CPC ....... *H01M 50/271* (2021.01); *H01M 50/503* (2021.01); *H01M 50/505* (2021.01)

(56) References Cited

U.S. PATENT DOCUMENTS

| | | | |
|---|---|---|---|
| 2005/0116805 A1 | 6/2005 | Taga et al. | |
| 2011/0081560 A1 | 4/2011 | Kim et al. | |
| 2013/0027174 A1 | 1/2013 | Masuda et al. | |
| 2016/0072166 A1 | 3/2016 | Park et al. | |
| 2016/0126534 A1* | 5/2016 | Lee ..................... | H01M 50/528 |
| | | | 429/61 |
| 2016/0260956 A1 | 9/2016 | Jang et al. | |
| 2018/0047970 A1 | 2/2018 | Lee | |
| 2020/0035979 A1 | 1/2020 | Yamamoto et al. | |

FOREIGN PATENT DOCUMENTS

| | | | |
|---|---|---|---|
| JP | 2001-54223 A | 2/2001 | |
| JP | 2004-47178 A | 2/2004 | |
| JP | 3826657 B2 | 9/2006 | |
| JP | 2012-252782 A | 12/2012 | |
| JP | 2014-154309 A | 8/2014 | |
| JP | 2014-232633 A | 12/2014 | |
| JP | 2017-107721 A | 6/2017 | |
| JP | 2018-509744 A | 4/2018 | |
| JP | 2019-197636 A | 11/2019 | |
| JP | 6643266 B2 | 2/2020 | |
| JP | 2020-123517 A | 8/2020 | |
| KR | 10-1094039 B1 | 12/2011 | |
| KR | 10-1389250 B1 | 4/2014 | |
| KR | 10-2016-0008948 A | 1/2016 | |
| KR | 10-2016-0106427 A | 9/2016 | |
| KR | 10-2017-0071242 A | 6/2017 | |
| KR | 10-2002448 B1 | 7/2019 | |
| WO | WO 2016/199558 A1 | 12/2025 | |

OTHER PUBLICATIONS

Extended European Search Report for European Application No. 21858481.1, dated Jul. 5, 2023.

* cited by examiner

BATTERY MODULE INCLUDING REMOVABLE FUSE ASSEMBLY AND BATTERY PACK INCLUDING THE SAME

TECHNICAL FIELD

The present disclosure relates to a battery module, and more particularly, to a battery module including a removable fuse assembly for preventing internal flame generation of the battery module during external short circuit.

The present application claims priority to Korean Patent Application No. 10-2020-0105314 filed on Aug. 21, 2020 in the Republic of Korea, the disclosure of which is incorporated herein by reference.

BACKGROUND ART

Semi-permanent batteries, which convert electric energy into a form of chemical energy and are capable of being repeatedly charged and discharged, are referred to as secondary batteries to be distinguished from primary batteries that are unable to be reused after being used once.

The secondary batteries include a lithium secondary battery, a nickel cadmium (Ni—Cd) battery, a lead storage battery, a nickel metal hydride (Ni-MH) battery, a zinc-air battery, an alkaline manganese battery, and the like. Thereamong, the lead storage battery and the lithium secondary battery are most actively commercialized secondary batteries.

In particular, the lithium secondary battery is recently actively used as an electric vehicle battery, due to advantages, such as high energy storage density, potential for weight-lightening and miniaturization, excellent stability, low discharge rate, and long-life. For reference, the lithium secondary battery is generally classified into a cylindrical type, an angular type, and a pouch type depending on a manufacturing type, and a purpose of use thereof spans an electronic switching system (ESS) battery, another electric device, and the like, in addition to the electric vehicle battery.

Currently, one lithium secondary battery (cell) is unable to obtain an output sufficient enough to drive an electric vehicle. To apply a secondary battery as an energy source of an electric vehicle, a battery module in which a plurality of lithium ion battery cells are connected in series and/or in parallel needs to be configured, and generally, a battery pack including a battery management system (BMS), a cooling system, a battery disconnection unit (BDU), harness wire, and the like, which connect the battery modules in series and functionally maintain the same, is configured.

Meanwhile, there is a possibility of internal ignition in a battery module when an overcurrent occurs due to a short circuit or the like of an external cable. When an external short circuit test is performed in battery cell units, a gas is generated inside a battery cell due to heat generation of an internal electrode and vaporization of an electrolyte, and thus a pouch sealing portion is opened due to an increase in internal pressure and heat generation in a cell lead portion, and the gas is externally vented. At this time, flame is intensified when the vented gas meets a spark that occurs at a cell lead of the battery cell.

To protect the battery module from the occurrence of the overcurrent caused by such an external short circuit, the battery module generally includes a fuse therein. The fuse is fused when the overcurrent flows to block a flow of a current, thereby preventing gas venting or spark occurrence in the battery cells. However, when the fuse is fused due to the flow of the overcurrent, a spark or flame is accompanied, and because the battery module according to the related art includes such a fuse, there is still concern over fire safety.

Also, an international safety certification test for transportation of a freight, such as the battery module or the like, includes a test item in which a standard requirement shortfall is determined when flame is generated for 1 second or more during the external short circuit of the battery module. Accordingly, a battery module to which a fuse is applied such that an external short circuit test in the international safety certification test is sufficiently passed is required.

DISCLOSURE

Technical Problem

The present disclosure is designed to solve the problems of the related art, and therefore the present disclosure is directed to providing a battery module capable of eliminating a possibility of flame generation inside the battery module during an external short circuit of the battery module.

Also, the present disclosure is directed to providing a battery module capable of satisfying a standard of an external short circuit test in an international certification test for transportation of the battery module.

However, the technical problems to be solved in the present disclosure are not limited to the above, and other problems that are not mentioned could be clearly understood by one of ordinary skill in the art from the description of the present disclosure below.

Technical Solution

In one aspect of the present disclosure, there is provided a battery module including a plurality of battery cells, a module case configured to accommodate the plurality of battery cells, an electrode terminal provided outside the module case, and a fuse assembly provided to be attachable to or detachable from an outer side of the module case, and including a busbar having a first end connected to the electrode terminal and a second end configured to be connected to an external cable, the fuse assembly configured to break when an overcurrent occurs, and a fuse case configured to accommodate the busbar.

The electrode terminal may have a bolt or nut shape, and the busbar may include a module assembly portion coupled to the electrode terminal, a cable assembly portion configured to be coupled to the external cable, and a bridge portion between the module assembly portion and the cable assembly portion and provided to be fused when an overcurrent flows.

A width of the bridge portion may be less than a width of the module assembly portion and a width of the cable assembly portion.

The bridge portion may include at least one notch.

The fuse case may include a case body including a wall body portion surrounding an outer perimeter of the busbar and having an upper portion and an opened lower portion, and a case cover covering the upper portion of the case body.

The case body may include at least one lower support body extending from a lower end of the wall body portion to support a lower surface of the busbar, and at least one upper support body protruding from an inner surface of the wall body portion to contact an upper surface of the busbar.

The upper support body may include an inclined surface inclined towards an internal direction of the case body.

The case body may include a reinforcing plate configured to cover one region of the bridge portion below the bridge portion.

The case body may include a mounting support protruding in an L-shape in an internal direction from an inner surface of the wall body portion, and the busbar may further include a bending pin bent to be arranged in contact on the mounting support.

The case cover may include a first cover configured to cover an upper portion of the module assembly portion, and a second cover configured to cover an upper portion of the cable assembly portion, the second cover independently movable from the first cover.

The first cover or the second cover may include a blocking plate inserted and arranged in perpendicular to an internal space of the case body, and the module assembly portion and the cable assembly portion may be isolated from each other by the blocking plate.

The case body may include a dummy block protruding in an external direction from one side of the wall body portion and including an insert nut therein, and the first cover may include a dummy cover arranged on the dummy block and including a bushing matched to a top and bottom of the insert nut.

The wall body portion may include, as a region where the dummy block is located, a strength reinforcing wall region having a thickness greater than a thickness of a remainder of the wall body portion.

The strength reinforcing wall region may include an outer wall body region, an inner wall body region, and a plurality of ribs connected to the outer wall body region and the inner wall body region.

In another aspect of the present disclosure, there is provided a battery pack including the battery module.

In another aspect of the present disclosure, there is provided a fuse assembly configured to be attachable to or detachable from an outer side of a module case as described above, the fuse assembly including a busbar having a first end configured to be connected to an electrode terminal of the battery module and a second end configured to be connected to an external cable and configured to break when an overcurrent occurs, and a fuse case configured to accommodate the busbar wherein the busbar may have a notch, and wherein the fuse case may have a case body including a wall body portion surrounding the busbar and having an upper portion and an opened lower portion and a case cover configured to cover the upper portion of the case body.

Advantageous Effects

According to an aspect of the present disclosure, a fuse assembly is located outside a battery module and thus a spark generated due to a fuse short circuit caused by an overcurrent during an external short circuit is generated outside the battery module, thereby eliminating an ignition risk inside the battery module.

Also, according to another aspect of the present disclosure, a fuse assembly that has a structure not deformed or damaged even by an external force, such as vibration, an impact, or the like, and is easily and conveniently handled by anyone may be provided.

Moreover, the fuse assembly includes a busbar that is strong against a physical external force as much as possible while employing a notch of a specific dimension such that a duration of a spark or flame caused by an overcurrent is less than 1 second, and thus may satisfy a passing condition for an external short circuit test in an international certification test.

MODE FOR DISCLOSURE

Figure 1:
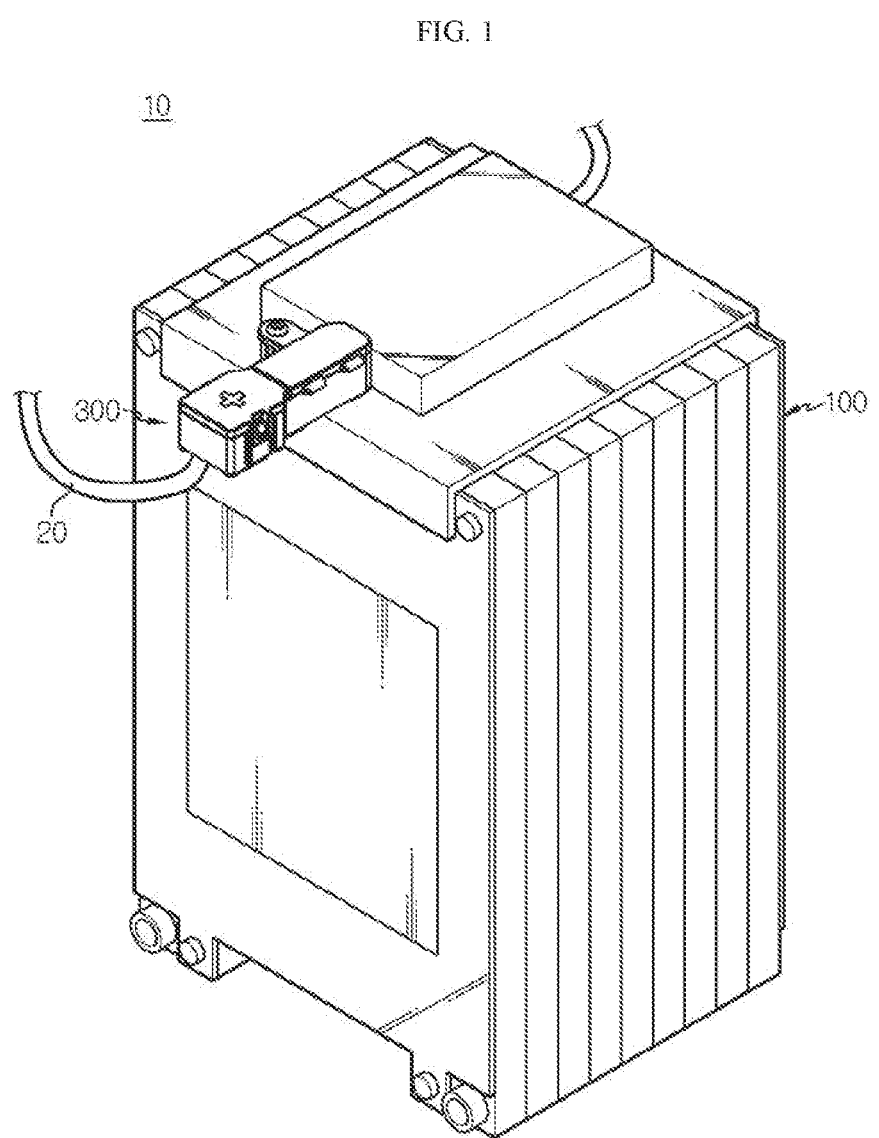
FIG. 1 is a perspective view schematically showing a configuration of a battery module, according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Embodiments of the present disclosure are provided to further fully describe the present disclosure to one of ordinary skill in the art, and thus shapes and sizes of elements in the drawing may be exaggerated, omitted, or schematically shown for a clearer description. Thus, the size or scale of each element does not entirely reflect the actual size or scale.

Figure 2:
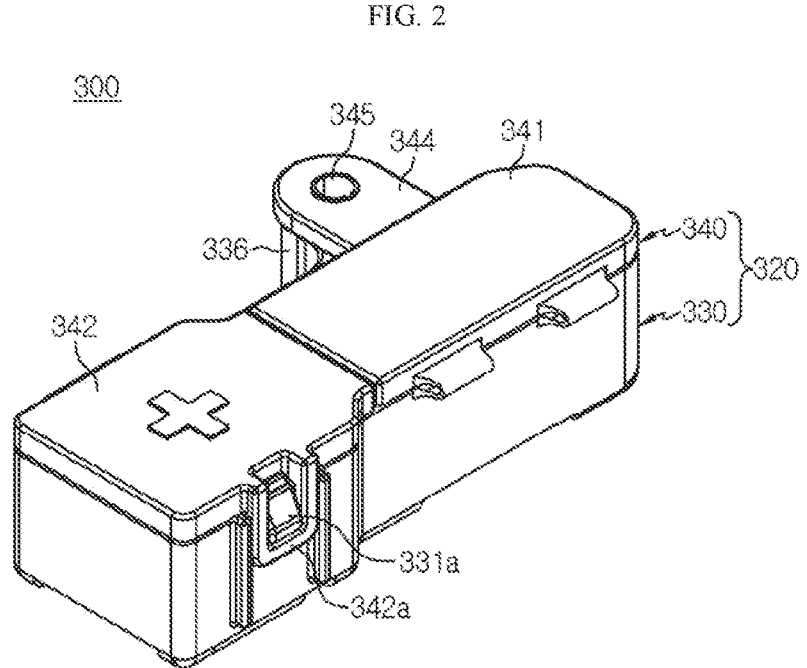
FIG. 2 is a perspective view of a fuse assembly of FIG. 1.
Figure 3:
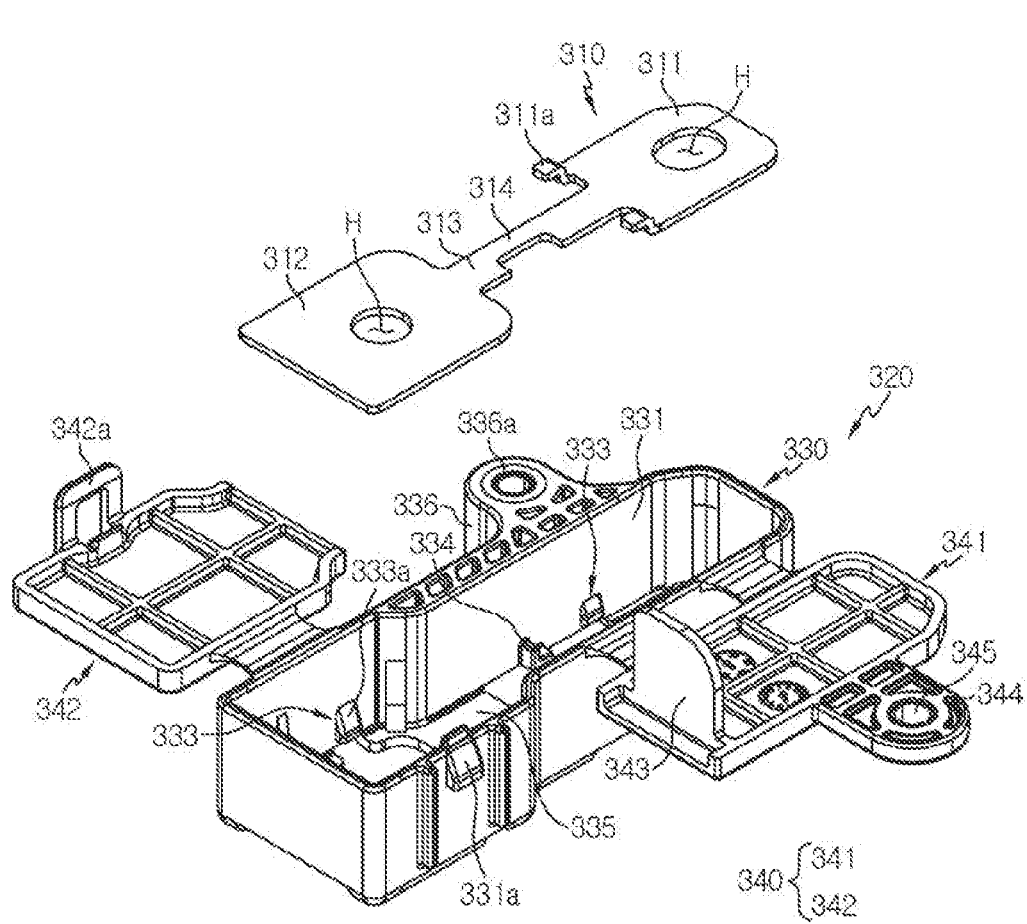
FIG. 3 is an exploded view of the fuse assembly of FIG. 2.

FIG. 1 is a perspective view schematically showing a configuration of a battery module, according to an embodiment of the present disclosure, FIG. 2 is a perspective view of a fuse assembly of FIG. 1, and FIG. 3 is an exploded view of the fuse assembly of FIG. 2.

As shown in the drawings, a battery module 10 according to an embodiment of the present disclosure includes a plurality of battery cells (not shown), a module case 100 accommodating the plurality of battery cells, and a fuse assembly 300 arranged outside the module case 100.

The battery cell of the battery module 10 according to the present disclosure may be any type of battery cell, such as a pouch type battery cell, a cylindrical type battery, cell, an angular type battery cell, or the like. The battery module 10 for a vehicle may use a pouch type battery cell that is easily stacked and has high energy density.

The pouch type battery cell includes an electrode assembly, an electrolyte, and a pouch exterior material for sealing and accommodating the electrode assembly and the electrolyte.

The electrode assembly has a stack structure of a positive electrode plate, a separation film, and a negative electrode plate in the stated order, the positive electrode plate and the negative electrode plate include electrode tabs, and the electrode tab is connected to an electrode lead. The electrode lead is arranged by extending from the inside to the outside of the pouch exterior material to function as an electrode terminal of the battery cell.

The pouch exterior material protects internal elements, such as the electrode assembly, the electrolyte, and the like, and may be configured in a form including a metal thin film, for example, an aluminum thin film, to supplement an electrochemical property by the electrode assembly and the electrolyte and enhance heat dissipation or the like. The aluminum thin film may be disposed between an internal adhesive layer and an insulation layer formed of an insulating material, so as to secure electric insulation.

The pouch type battery cells may be connected in series and/or in parallel, according to pre-determined output and capacity of the battery module 10. For example, four battery cells may be connected in series and in parallel by integrally welding positive electrode leads of two or more battery cells and negative electrode leads of other two or more battery cells to one metal bar, while the pouch type battery cells are stacked in one direction. The battery cells included in the battery module 10 may be entirely connected in series and/or in parallel when such a pattern above is repeated.

The battery cells may be accommodated inside the module case 100, while forming a stack structure. The module case 100 may be manufactured with a material having high mechanical rigidity so as to protect the battery cells from an external impact. A sensing cable for sensing voltages or temperatures of the battery cells, metal bars used as electric connection media, a support frame for reinforcing rigidity of the battery cells, a cooling element for temperature management, and the like may be accommodated together in the module case 100.

Control elements including a battery management system (BMS) for diagnosing, estimating, and managing states of the battery cells, a relay for controlling power, a current sensor, and the like may be further arranged on an outer surface of the module case 100.

A positive electrode terminal and positive electrode terminal of the battery module 10 may be provided to be exposed at the outer surface of the module case 100.

An electrode terminal 200 of the battery module 10 according to the present embodiment includes the positive electrode terminal and the negative electrode terminal, and may be configured to protrude in a bolt (or nut) shape at an upper portion of the module case 100.

Meanwhile, the fuse assembly 300 according to an embodiment of the present disclosure is configured to be attachable to or detachable from an outer side of the module case 100.

As will be described in detail below, the fuse assembly 300 of the present embodiment may be configured to be assembled and fixed at the electrode terminal 200 from the outer side of the module case 100. Accordingly, even when a spark is generated due to a short circuit of the fuse assembly 300 when an overcurrent occurs by an external short circuit, the inside of the battery module 10 is not affected, and thus an internal ignition risk of the battery module 10 may be eliminated.

Also, in the battery module 10 in which a fuse is inside the module case 100, according to the related art, when the fuse is fused due to an overcurrent, an operation of replacing the fuse is not easy, for example, the battery module 10 needs to be disassembled and a fuse line wiring system needs to be entirely replaced. However, it is very easy to maintain, repair, and manage the battery module 10 according to the present disclosure, because a fused busbar 310 is replaced by a new product in the fuse assembly 300.

Hereinafter, such a fuse assembly 300 will be described in detail.

Referring to FIG. 3, the fuse assembly 300 includes the busbar 310 that may be fused when an overcurrent flows because a notch 314 is applied, and a fuse case 320 for protecting the busbar 310.

The busbar 310 may be provided in a plate shape formed of a metal material (e.g., copper (Cu)) and may include a hole H at both end portions such that one end portion is coupled to the electrode terminal 200 via a bolt/nut and the other end portion is coupled to a ring terminal (not shown) of an external cable 20 via a bolt/nut.

In detail, the busbar 310 according to the present disclosure may include a module assembly portion 311 coupled at the electrode terminal 200, a cable assembly portion 312 coupled at the external cable 20, and a bridge portion 313 extending between the module assembly portion 311 and the cable assembly portion 312.

The module assembly portion 311 has a width corresponding to a width of the fuse case 320 to be described below, and includes the hole H at a center thereof. The hole H may have a size sufficient enough to be inserted into the electrode terminal 200 provided in a bolt shape.

Also, the module assembly portion 311 of the present embodiment may further include a bending pin 311a. The bending pin 311a is a portion that is bent approximately in a ⌐-shape, and may be mounted on a mounting support 334 of the fuse case 320 to be described below. For example, it is easy to assemble the busbar 310 to the fuse case 320 when the location of the busbar 310 is set such that the bending pin 311a of the busbar 310 is placed on the mounting support 334 of the fuse case 320, and as shown in the drawing, when the bending pin 311a is placed on the mounting support 334, the module assembly portion 311 may be constrained from moving in all directions and an up-and-down direction in the fuse case 320.

The cable assembly portion 312 has a similar shape to the module assembly portion 311, has a width corresponding to a left-and-right width of a portion of the fuse case 320 where the cable assembly portion 312 is to be amounted, and includes a hole at a center thereof. Although not illustrated, an end portion of the external cable 20 may be provided in a form of a ring terminal. A hole of the ring terminal and the hole of the cable assembly portion 312 are matched, a bolt is inserted into the holes, and a nut is fastened, thereby fixing the ring terminal and the cable assembly portion 312. For reference, the external cable 20 may be replaced by an inter-busbar (not shown). Here, the inter-busbar refers to an element provided in a form of a metal plate mainly used to connect two battery (modules 10 in series, in the related art.

The bridge portion 313 is a portion that is fused when an overcurrent flows, and has a relatively narrower width than the module assembly portion 311 and the cable assembly portion 312.

Figure 4:
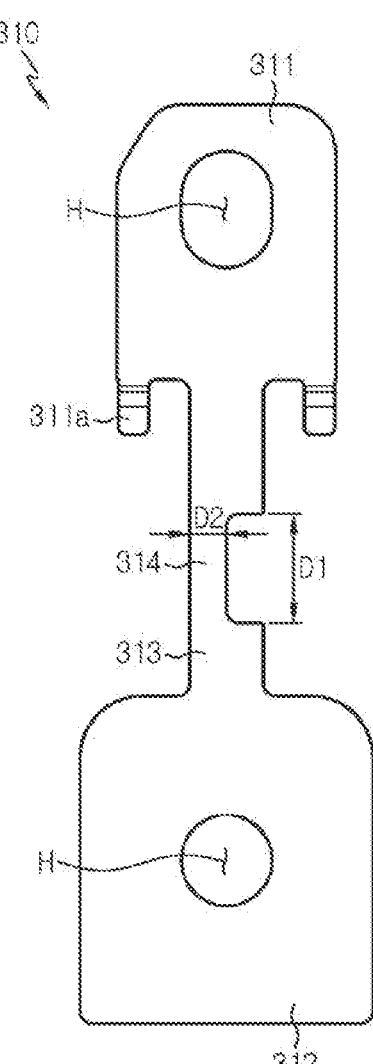
FIG. 4 is a plan view of a busbar of FIG. 3.

Also, the bridge portion 313 includes at least one notch 314. For example, as shown in FIG. 4, the notch 314 is a portion where the bridge portion 313 is formed thinner, and has a width D2 formed narrower than a length D1, and thus may be fused as a spark is generated during an external short circuit.

Meanwhile, a dimension of the notch 314 may be selected within a range in which rigidity of a certain level or greater is exhibited with respect to an external force (vibration or impact) and the fuse case 320 barely cracks or breaks despite of a flame or spark during an external short circuit.

The fuse case 320 is a configuration for protecting the busbar 310, and includes a case body 330 and a case cover 340.

The case body 330 includes a wall body portion 331 forming a wall body surrounding an outer perimeter of the busbar 310, and may be provided in a form of a box having an upper portion and lower portion opened. The wall body portion 331 may be configured approximately in a form of a closed loop along an outer circumference of the busbar 310, the lower portion of the case body 330 may be configured to be opened for a connection with the electrode terminal 200 or external cable 20, and the upper portion of the case body 330 may be configured to be opened hut closed or opened by the case cover 340.

The case body 330 is a configuration for securing fixability and improving assembly convenience of the busbar 310, and includes a lower support body 332, an upper support body 333, and the mounting support 334.

Figure 5:
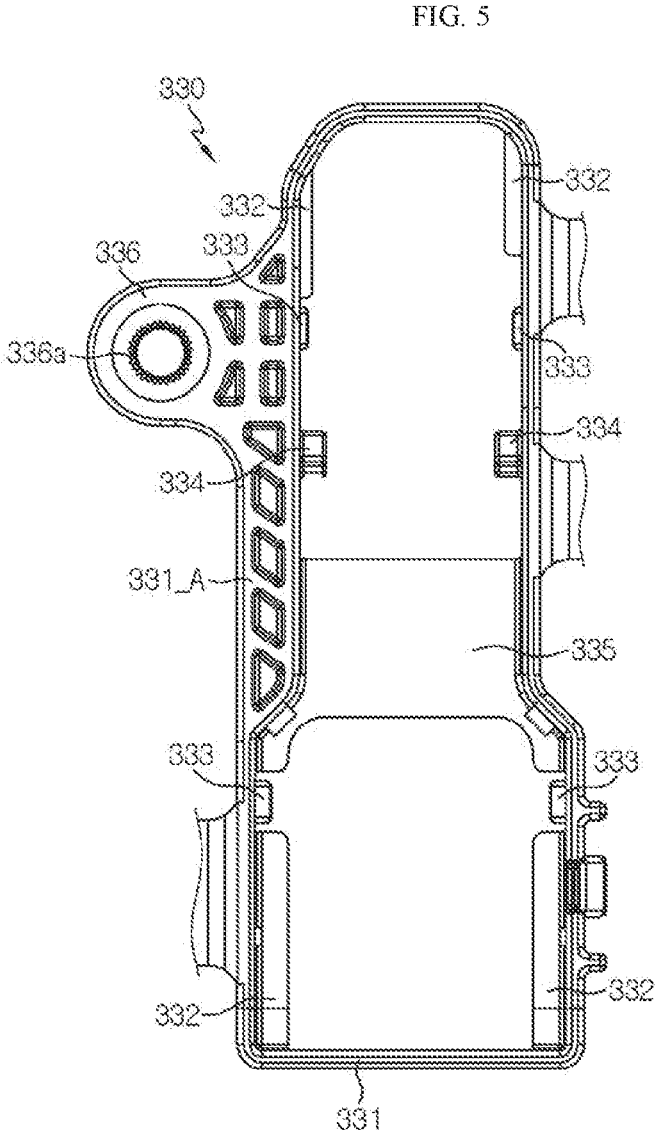
FIG. 5 is a plan view of a case body according to an embodiment of the present disclosure.
Figure 6:
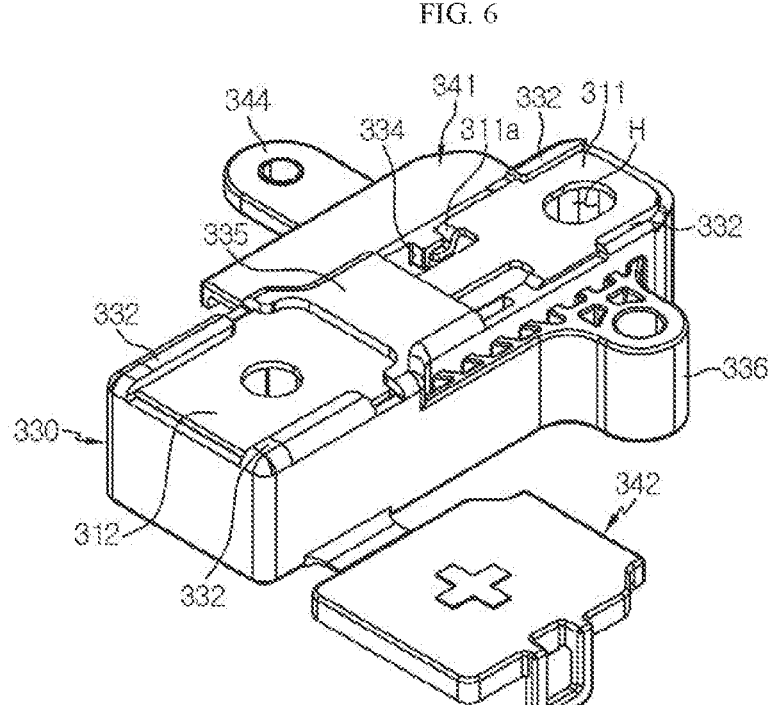
FIG. 6 is a perspective view of a fuse assembly turned upside down, according to an embodiment of the disclosure.
Figure 7:
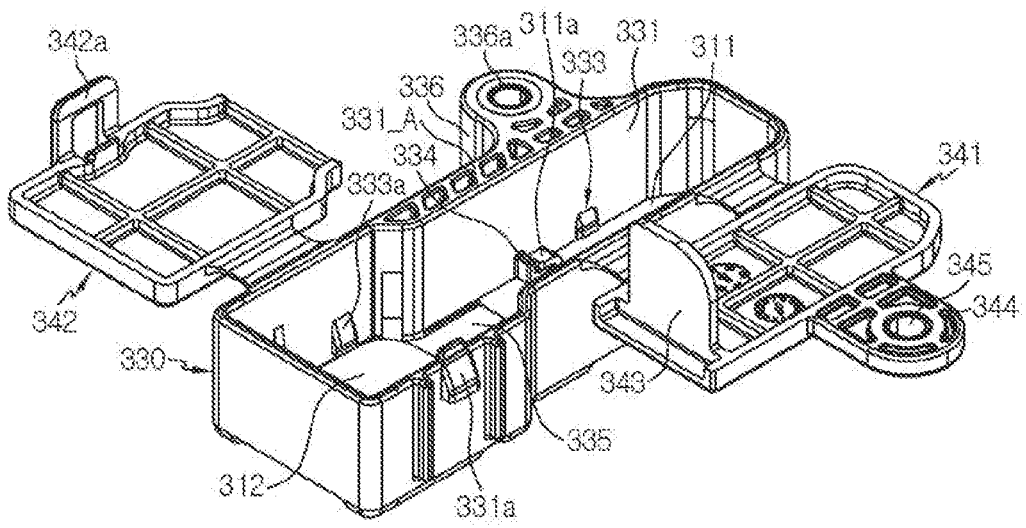
FIG. 7 is a perspective view of the fuse assembly of FIG. 6 inverted again.

Referring to FIGS. 5 through 7, the lower support body 332 is a portion bending and extending in an internal direction from a lower end of the wall body portion 331. There may be a plurality of lower support bodies 332 provided along a circumferential direction of the case body 330. A boundary portion of a lower surface of the busbar 310 is supported by such a lower support body 332, and thus the busbar 310 may not escape in a downward direction of the case body 330.

The upper support body 333 supports an upper surface of the busbar 310 in a form protruding in an internal direction from an inner surface of the wall body portion 331 such that a lower surface thereof presses the upper surface of the busbar 310. As shown in FIG. 7, the upper support body 333 further includes an inclined surface 333a including towards an internal direction of the case body 330. A plurality of upper support bodies 333 may be provided alternately with the lower support body 332 along a circumferential direction of the case body 330.

For example, when the upper support body 333 is pressed with force while a boundary of the busbar 310 is placed on the inclined surface 333a of the upper support body 333, the busbar 310 slides down along the inclined surface 333a and is mounted on an upper surface of the lower support body 332 as a width of the case body 330 is slightly widened, and then the width of the case body is returned to its original state, and thus a lower surface of the upper support body 333 may be located on the boundary of the busbar. Accordingly, a boundary portion of the busbar 310 is strongly fitted between the lower support body 332 and the upper support body 333, and thus the busbar 310 may be fixed in the case body 330 without moving.

The mounting support 334 is a portion protruding approximately in an L-shape in an internal direction from an inner surface of the wall body portion 331 and is a place where the bending pin 311a having the ]-shape of the module assembly portion 311 described above is mounted. A horizontal portion 334a of the mounting support 334 may be a portion supporting a lower portion of the bending pin 311a, and a vertical portion 334b thereof may be a portion operating as a stopper preventing the bending pin 311a from being pushed in a horizontal direction after being placed on the mounting support 334.

In the present embodiment, the bending pin 311a of the module assembly portion 311 is realized in a form bent approximately in the ]-shape, but the bending pin 311a may be bent in any shape, such as a T-shape, an S-shape, or the like, as long as the bending pin 311a is bent to be arranged in contact on the mounting support.

There may be two mounting supports 334, each provided in a width direction of the case body 330, and the module assembly portion 311 may also include two bending pins 311a to correspond to the mounting supports 334.

According to such a configuration, when the busbar 310 is inserted into the case body 330 such that the two mounting supports 334 and the two bending pins 311a are matched to each other, the busbar 310 is aligned at a correct position with respect to the case body 330, and thus there is no risk of mis-assembly of the busbar 310.

As shown in FIGS. 5 and 6, the case body 330 further includes a reinforcing plate 335 provided to support a lower portion of the bridge portion 313.

The reinforcing plate 335 is a portion for protecting the bridge portion 313 having weakest rigidity in the bus bar 310 from an external impact. The reinforcing plate 335 may be configured to cover a lower portion of the case body 330 corresponding to the notch 314, such that a region of the notch 314 having weakest rigidity is not exposed to the outside.

Also, with respect to the case body 330, the wall body portion 331 further includes a strength reinforcing wall region 331_A.

The strength reinforcing wall region 331_A is a region where a dummy block 336 to be described below is located, and may absorb an impact applied to the case body 330, as a portion formed to have a thickness is thicker than other regions.

As will be described below, when the case body 330 of the present embodiment is covered by the case cover 340, a bolt is coupled to the dummy block 336. Here, the strength reinforcing wall region 331_A may absorb a tightening force of the bolt such that the case body 330 is not damaged.

Figure 8:
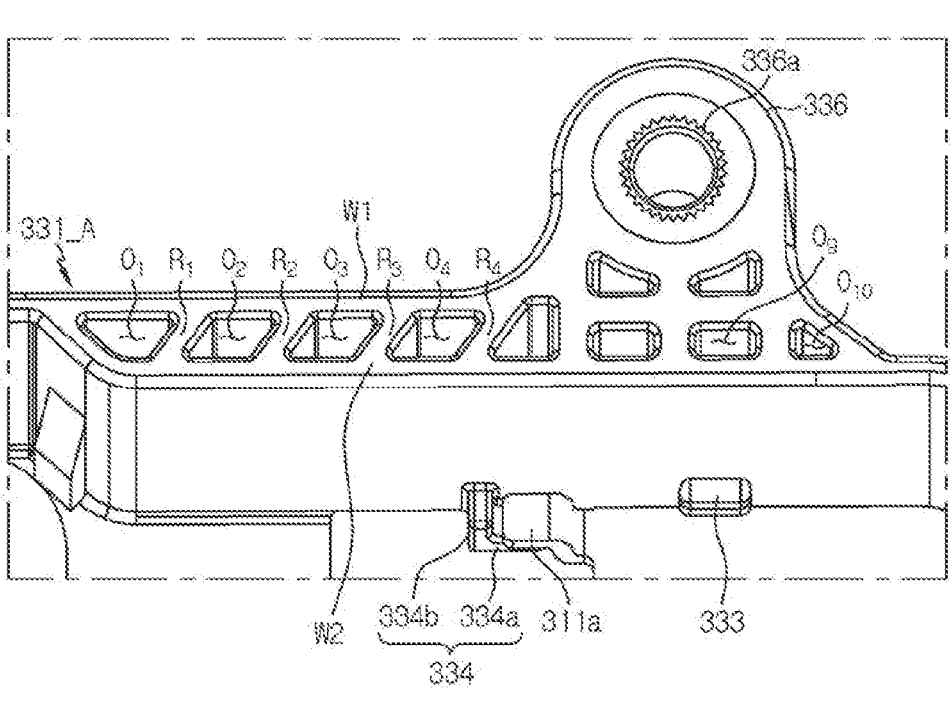
FIG. 8 is an enlarged view of a strength reinforcing wall region of FIG. 7.

In detail, referring to the strength reinforcing wall region 331_A according to the present embodiment with reference to FIG. 8, the strength reinforcing wall region 331_A may include an outer wall body region W1, an inner wall body region W2, and a plurality of ribs $R_1$, $R_2$, $R_3$, $R_4$, and so on connected to the outer wall body region W1 and inner wall body region W2.

Recesses $O_1$ through $O_{10}$ are formed between the outer wall body region W1 and inner wall body region W2 such that the strength reinforcing wall region 331_A has a less weight relative to a thickness, and the plurality of ribs R1, R2, R3, R4, and so on are applied such that an impact that may be applied to the outer wall body region W1 and inner wall body region W2 is distributed.

Thus, according to such a configuration of the present disclosure, the rigidity of the case body 330 may be sufficiently maintained regardless of an external impact, vibration, or the tightening force during coupling of the bolt.

Meanwhile, two case covers 340 according to an embodiment of the present disclosure may be configured so as to independently open or close the upper portion of the module assembly portion 311 and the upper portion of the cable assembly portion 312. In other words, the case cover 340 includes a first cover 341 and a second cover 342 independently covering the upper portion of the module assembly portion 311 and the upper portion of the cable assembly portion 312, respectively.

The first cover 341 or second cover 342 may include a blocking plate 343 inserted and arranged in perpendicular to an internal space of the case body 330.

According to the present embodiment, the blocking plate 343 may be provided at the first cover 341. When the upper portion of the case body 330 is covered by such a first cover 341, the module assembly portion 311 and the cable assembly portion 312 may be isolated from each other by the blocking plate 343.

According to such a configuration of the case cover 340 of the present disclosure, when the external cable 20 is coupled to the cable assembly portion 312, a bolt/nut operation may be performed by using a tool while the first cover 341 is closed and the second cover 342 is opened such that only the cable assembly portion 312 of the busbar 310 is exposed vertically, and thus safety of an installation operation of the external cable 20 and mis-assembly prevention may be effective.

Referring back to FIG. 7, the second cover 342 is configured to be easily opened or closed by using a structure of coupling a hook 342a to the case body 330, and the first cover 341 is configured to be further firmly opened or closed with respect to the case body 330 compared to the second cover 342, by using a structure of coupling a bolt/nut to the case body 330. This is considering that the module assembly portion 311 connected to the electrode terminal 200 of the battery module 10 is not separated once being coupled, unless there is a special circumstance, and thus protection of the corresponding portion needs to be solidified, whereas connection and separation frequencies of the external cable 20 and the cable assembly portion 312 may be relatively great.

In detail, referring to an opening/closing structure of the first cover 341 and case body 330, the case body 330 further includes the dummy block 336 protruding in an external direction from one side of the wall body portion 331, and the first cover 341 includes a dummy cover 344 arranged on the dummy block 336 when the first cover 341 is closed.

The dummy block 336 includes an insert nut 336a formed of a metal material via insert injection molding, and the dummy cover 344 includes a through-hole into which a bolt is insertable, and a bushing 345 formed of a metal material disposed in the through-hole. When the upper portion of the case body 330 is covered by the first cover 341, the dummy block 336 is covered by the dummy cover 344, and at this time, the insert nut 336a and the bushing 345 are matched vertically. Here, a bolt is inserted into the bushing 345 and turned to be coupled to the insert nut 336a. Such a first cover 341 may be fixed and mounted on the case cover 340 almost without a damage risk even when the first cover 341 is assembled/disassembled several times by using a bolt and a nut.

FIGS. 9 through 12 are views for describing an installation example of the fuse assembly 300, according to an embodiment of the present disclosure.

Next, an assembling/disassembling method of the fuse assembly 300 will be briefly described with reference to FIGS. 9 through 12.

Figures 9, 10:
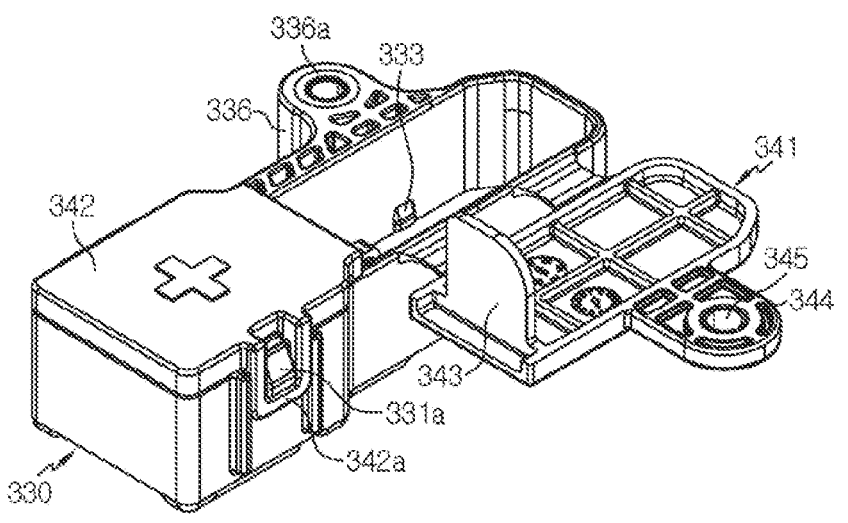
FIGS. 9 through 12 are views for describing a mounting example of a fuse assembly, according to an embodiment of the present disclosure.

First, as shown in FIG. 9, the busbar 310 including the notch 314 is accommodated in the fuse case 320. As described above, a location and direction of the busbar 310 are set such that the bending pin 311a of the module assembly portion 311 is placed on the mounting support 334 of the case body 330, and the busbar 310 is inserted into the case body 330. Here, a lower surface of the busbar 310 is supported by the lower support body 332 in the case body 330, and an upper surface of the busbar 310 is supported by the upper support body 333 in the case body 330, and thus the busbar 310 may be constrained without movement.

Then, as shown in FIG. 10, the hook 342a of the second cover 342 is coupled to an engaging ledge 331a on an outer surface of the case body 330 via snap-fit, thereby shielding the upper portion of the cable assembly portion 312.

Figure 11:
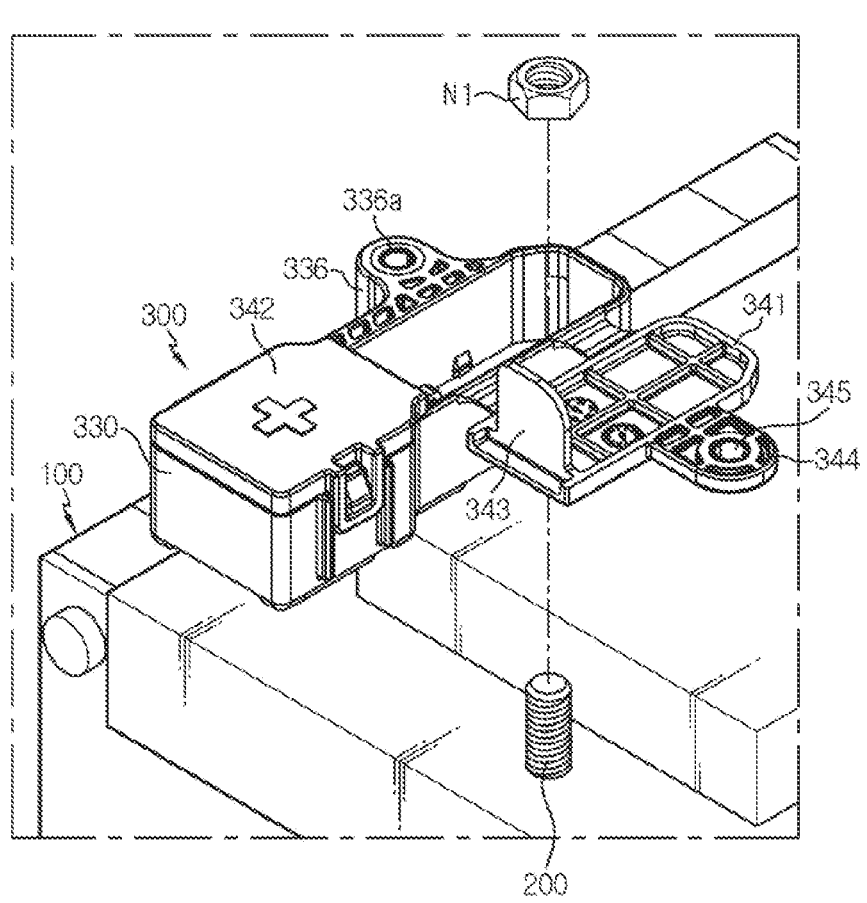

Next, as shown in FIG. 11, the fuse assembly 300 is assembled to the electrode terminal 200 of the module case 100. A hole of the module assembly portion 311 is inserted into the electrode terminal 200 of a bolt type via the opened lower portion of the case body 330, and the bus bar 310 is fixed by fastening a module nut N1.

Figure 12:
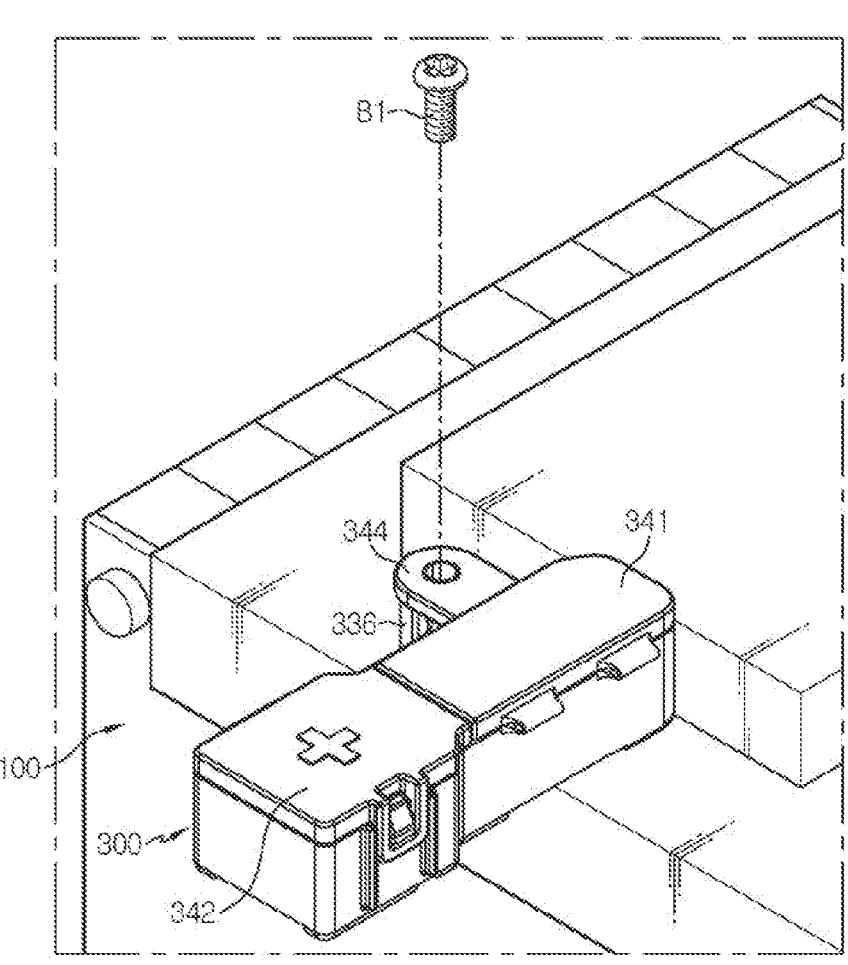

Lastly, as shown in FIG. 12, the upper portion of the module assembly portion 311 is closed by the first cover 341 and a bolt B1 for a case is fastened to the dummy cover 344 and dummy block 336, such that the first cover 341 is not opened. For reference, the fuse assembly 300 may be disassembled by performing an assembling order described above in an inverse order.

As described above, according to the configuration and operation of the battery module 10 according to the present disclosure, an ignition risk inside the battery module 10 caused by an overcurrent during external short circuit may be significantly reduced because the fuse assembly 300 is located outside the battery module 10.

Moreover, the fuse assembly 300 includes the busbar 300 that is strong against a physical external force as much as possible while employing the notch 314 in which a duration of a spark or flame caused by an overcurrent is less than 1 second, and thus may satisfy a passing condition for an external short circuit test in an international certification test.

Meanwhile, the battery module 10 that has passed safety verification as above may be transported internationally while the fuse assembly 300 is attached thereto, and then when required, the fuse assembly 300 may be detached from the electrode terminal 200 to be used independently or may be connected to another battery module to configure a battery pack. Obviously, it is possible to use the battery module while the fuse assembly is still attached thereto without having to necessarily detach the fuse assembly.

A battery pack according to the present disclosure may include one or more battery modules according to the present disclosure. Also, the battery pack according to the present disclosure may further include, in addition to the battery module, a pack case for accommodating the battery module, various devices for controlling charging and discharging of each battery module, for example, a master BMS, a current sensor, a fuse, and the like.

The battery module according to the present disclosure may be applied to a vehicle, such as an electric vehicle or a hybrid vehicle. In other words, the vehicle may include the battery module according to the present disclosure.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, terms used to indicate directions such as up, down, let, and right are used in the present specification, but these terms are merely for convenience of description and it would be obvious to one of ordinary skill in the art that the terms may vary depending on a location of a target object or a location of an observer.

What is claimed is:

1. A battery module comprising:
a plurality of battery cells;
a module case configured to accommodate the plurality of battery cells;
an electrode terminal provided outside the module case; and
a fuse assembly provided to be attachable to or detachable from an outer side of the module case, the fuse assembly comprising a plate-shaped busbar configured to break when an overcurrent occurs and a fuse case configured to accommodate the busbar,
wherein the busbar has a first end configured to be directly connected to the electrode terminal through a bottom portion of the fuse case and a second end configured to be directly connected to an external cable through the bottom portion of the fuse case.

2. The battery module of claim 1, wherein the electrode terminal has a bolt or nut shape, and
wherein the busbar comprises:
a module assembly portion coupled to the electrode terminal;
a cable assembly portion configured to be coupled to the external cable; and
a bridge portion between the module assembly portion and the cable assembly portion and provided to be fused when an overcurrent flows.

3. The battery module of claim 2, wherein a width of the bridge portion is less than a width of the module assembly portion and a width of the cable assembly portion.

4. The battery module of claim 3, wherein the bridge portion comprises at least one notch.

5. The battery module of claim 2, wherein the fuse case comprises:
a case body including a wall body portion surrounding an outer perimeter of the busbar and having an upper portion and an opened lower portion, wherein the busbar at least partially closes the opened lower portion; and
a case cover covering the upper portion of the case body.

6. The battery module of claim 5, wherein the case body comprises:
at least one lower support body extending from a lower end of the wall body portion to support a lower surface of the busbar; and

12 at least one upper support body protruding from an inner surface of the wall body portion to contact an upper surface of the busbar.

7. The battery module of claim 6, wherein the upper support body comprises an inclined surface inclined towards an internal direction of the case body.

8. The battery module of claim 5, wherein the case body comprises a reinforcing plate configured to cover one region of the bridge portion below the bridge portion.

9. The battery module of claim 5, wherein the case body comprises a mounting support protruding in an L-shape in an internal direction from an inner surface of the wall body portion, and
wherein the busbar further comprises a bending pin bent to be arranged in contact on the mounting support.

10. The battery module of claim 5, wherein the case cover comprises:
a first cover configured to cover an upper portion of the module assembly portion; and
a second cover configured to cover an upper portion of the cable assembly portion, the second cover independently movable of the first cover.

11. The battery module of claim 10, wherein the first cover or the second cover comprises a blocking plate inserted and arranged in perpendicular to an internal space of the case body, and
wherein the module assembly portion and the cable assembly portion are isolated from each other by the blocking plate.

12. The battery module of claim 10, wherein the case body comprises a dummy block protruding in an external direction from one side of the wall body portion and including an insert nut therein, and
wherein the first cover comprises a dummy cover arranged on the dummy block and including a bushing vertically matched to the insert nut.

13. The battery module of claim 12, wherein the wall body portion comprises, as a region where the dummy block is located, a strength reinforcing wall region having a thickness greater than a thickness of a remainder of the wall body portion.

14. The battery module of claim 13, wherein the strength reinforcing wall region comprises:
an outer wall body region;
an inner wall body region; and
a plurality of ribs connected to the outer wall body region and the inner wall body region.

15. A battery pack comprising the battery module according to claim 1.

* * * * *